United States Patent
Kurihara et al.

(10) Patent No.: US 8,153,036 B2
(45) Date of Patent: Apr. 10, 2012

(54) THERMOPLASTIC POLYMER POWDER

(75) Inventors: Toyoaki Kurihara, Ibaraki (JP); Kenichi Hamada, Ibaraki (JP)

(73) Assignee: Kuraray Co., Ltd., Kurashiki-shi (JP)

(*) Notice: Subject to any disclaimer, the term of this patent is extended or adjusted under 35 U.S.C. 154(b) by 409 days.

(21) Appl. No.: 12/370,875

(22) Filed: Feb. 13, 2009

(65) Prior Publication Data

US 2009/0152383 A1 Jun. 18, 2009

Related U.S. Application Data

(63) Continuation of application No. 10/533,808, filed as application No. PCT/JP03/13943 on Oct. 30, 2003, now abandoned.

(30) Foreign Application Priority Data

Nov. 6, 2002 (JP) .................................. 2002-321927

(51) Int. Cl.
*C08L 53/00* (2006.01)
*B02C 23/18* (2006.01)

(52) U.S. Cl. .................. 264/5; 264/13; 264/14; 525/227

(58) Field of Classification Search ............... 264/5, 13, 264/14; 525/227
See application file for complete search history.

(56) References Cited

U.S. PATENT DOCUMENTS

| | | | |
|---|---|---|---|
| 5,308,699 A | 5/1994 | Hikasa et al. | |
| 6,329,480 B1 | 12/2001 | Uchiumi et al. | |
| 6,376,647 B1 | 4/2002 | Tomihashi et al. | |
| 6,627,314 B2 | 9/2003 | Matyjaszewski et al. | |
| 2004/0034183 A1 | 2/2004 | Kato et al. | |
| 2006/0223936 A1 | 10/2006 | Such et al. | |

FOREIGN PATENT DOCUMENTS

| | | |
|---|---|---|
| EP | 0 563 967 | 10/1993 |
| EP | 1 329 466 | 7/2003 |
| JP | 5-5050 | 1/1993 |
| JP | 11-49948 | 2/1999 |
| JP | 11-335435 | 12/1999 |
| JP | 2001-200026 | 7/2001 |
| JP | 2002-265747 | 9/2002 |
| WO | 02/26847 | 4/2002 |

OTHER PUBLICATIONS

Merriam-Webster New Collegate Dictionary (1983).
Sumitomo Chemical, Derwent Abstract ACC-No. 1997-113985 (1997).
Nagasawa CAPLUS AN 1978: 170770 (May 1984).

*Primary Examiner* — Jeffrey Mullis
(74) *Attorney, Agent, or Firm* — Oblon, Spivak, McClelland, Maier & Neustadt, L.L.P.

(57) ABSTRACT

A process for producing a thermoplastic polymer powder that is made by subjecting an acrylic triblock copolymer (B)(A)(B) to an underwater cutting process to obtain a thermoplastic polymer powder, wherein block (A) has structural units originating from an acrylic ester; and block (B) has structural units originating from a methacrylic ester, this thermoplastic polymer powder is suitable for use as molding, skin material, and the like which are excellent in weatherability, flexibility, mechanical strength, low-temperature properties, adhesion to polar resins, rubber elasticity, safety, etc.

14 Claims, No Drawings

THERMOPLASTIC POLYMER POWDER

CROSS-REFERENCE TO RELATED APPLICATIONS

The present application is a continuation application of U.S. Ser. No. 10/533,808, pending, which is a 371 of PCT/JP03/13943 filed Oct. 30, 2003.

TECHNICAL FIELD

The present invention relates to a thermoplastic polymer powder, a molded product produced by use of the same, and a process for producing the molded product. More specifically, the present invention relates to a thermoplastic polymer powder which can be used suitably for molding techniques and coating techniques employing a powder, such as slush molding, rotational molding, powder flame spraying, extrusion molding, calendaring, compression molding and powder coating, a molded product produced by use of the same, and a process for producing the molded product. When the thermoplastic polymer powder of the present invention is used to perform any one of the above-mentioned molding and coating techniques, it is possible to produce smoothly a molded product, a skin material, a painted film, a composite product having the skin material or painted film, and so on which cause a lower degree of environmental pollution based on halogen or the like, have good safety, and are further excellent in weatherability, flexibility, mechanical strength, low-temperature properties, adhesion to polar resins, rubber elasticity, and other properties.

BACKGROUND ART

Skin materials produced by use of a soft polyvinyl chloride resin composition are inexpensive and excellent in flexibility and scratch resistance. Therefore, the skin materials have widely been used hitherto in fields of automobile interior members such as instrument panels, door trims, console boxes and seats, furniture such as sofas and chairs, and so on. At the time of producing these skin materials, there has been popularly used slush molding, wherein a powdery polyvinyl chloride resin composition is stuck onto the surface of a mold having a complicated shape and then the composition is heated and molded, in the prior art. Since soft polyvinyl chloride resin powder is inexpensive and excellent in flexibility and can be fashioned into a complicated shape, the powder has widely been used also in the production of toys and others by rotational molding.

However, polyvinyl chloride resin generates harmful substances such as dioxin when the resin is incinerated, and further it is suspected that a plasticizer used therein acts as environmental disrupter, carcinogens, or the like. Thus, the resin has problems about environmental pollution and safety. There are also caused problems, such as bleed-out and fogging resulting from the plasticizer.

In light of the above-mentioned points, investigation has been made in recent years about the matter that a thermoplastic elastomer which does not contain any halogen or any plasticizer is used instead of polyvinyl chloride resin and the elastomer is subjected to slush molding.

Of molding methods and coating methods using powder, slush molding or rotational molding is performed without applying any fashioning pressure. It is therefore necessary that powdery material stuck onto a mold at the time of molding is melted and flows under no applied pressure so as to form a coating. From this viewpoint, the thermoplastic elastomer powder used in slush molding or rotational molding has a requirement that the melt viscosity thereof is low under low shearing.

As the thermoplastic elastomer powder which is low in melt viscosity under low shearing, has fluidity even under conditions that no fashioning pressure is applied and further can be applied to slush molding, there is known a thermoplastic elastomer powder for slush molding which is made of an elastomer composition of an ethylene/α-olefin copolymer rubber and a polyolefin resin (see JP-A-5-5050). However, the thermoplastic elastomer powder for slush molding described in the JP-A-5-5050 is a nonpolar resin; therefore, the powder is low in adhesion to polar resins such as polyurethane resin and ABS resin, and thus a composite body or the like which is composed of the elastomer and a polar resin is not easily produced. A molded product obtained from this thermoplastic elastomer powder is not sufficiently satisfactory in flexibility.

As the material for slush molding which exhibits adhesion to polar resins, suggested is a material for slush molding which comprises a thermoplastic polyurethane elastomer, a plasticizer, a block polyisocyanate, and a pigment (JP-A-11-49948). However, this material for slush molding has a problem that the plasticizer, which is used to keep low-temperature properties, melt fluidity, flexibility and others, causes bleed-out or fogging in the same manner as the flexible polyvinyl chloride resin powder, and other problems. This material for slush molding is also low in weatherability since the base thereof is the polyurethane elastomer.

An object of the present invention is to provide a thermoplastic polymer powder which: is good in melt fluidity; can be used suitably for molding techniques using powder, such as slush molding and rotational molding, powder coating techniques and the like; does not contain any halogen nor any plasticizer; does not cause environmental pollution or anxiety about carcinogenicity; and can be further made into a high-quality molded product, skin material or painted film excellent in weatherability, flexibility, rubber elasticity, low-temperature properties, adhesion to polar resins, texture, external appearances and others.

Another object of the present invention is to provide a molded product obtained from the thermoplastic polymer powder, and a process for producing the same.

DISCLOSURE OF THE INVENTION

The inventors have repeated eager investigation in order to attain the above-mentioned objects. As a result, it has been found out that a thermoplastic polymer powder which is made mainly of an acrylic block copolymer having a specific block structure and further has specific dynamic viscosity properties is good in melt fluidity, and can be used suitably for various molding techniques employing powder, such as slush molding and rotational molding, and powder coating technique. It has been found out that the molded product, skin material, painted film and the like that are obtained by use of the thermoplastic polymer powder cause no anxiety of environmental pollution and further have excellent safety since they do not contain any halogen or any plasticizer, and that they are excellent in weatherability, flexibility, rubber elasticity, low-temperature properties, adhesion to polar resins, texture, external appearances and others.

An acrylic polymer powder which can be used suitably for molding techniques using powder, such as slush molding and rotational molding, and powder coating, and which gives a molded product, a skin material, a painted film or some other product that is excellent in flexibility, rubber elasticity, weatherability, low-temperature properties, texture and others by the molding techniques or coating technique has not been known in the prior art; and has been unprecedentedly found out by the inventors.

Accordingly, the present invention is:

(1) a thermoplastic polymer powder which (i) is made mainly of an acrylic block copolymer (I) comprising one or more polymer blocks (A) made mainly of structural units originating from an acrylic ester [referred to as acrylic ester polymer block(s) (A) hereinafter]; and at least one polymer block bonded thereto and selected from polymer blocks (B) made mainly of structural units originating from a methacrylic ester [referred to as methacrylic ester polymer blocks (B) hereinafter] and polymer blocks (C) made mainly of structural units originating from an acrylic ester different from that of the acrylic ester polymer block(s) (A) [referred to as acrylic ester polymer blocks (C) hereinafter];

(ii) has a complex dynamic viscosity $\eta^*(5)$ of $5.0\times10^3$ Pa·s or less, the viscosity $\eta^*(5)$ being measured under conditions of a temperature of 250° C. and an angular frequency of 5 rad/sec;

(iii) has a Newtonian viscosity index n of 0.50 or less, the Newtonian viscosity index n being represented by the following equation (1):

$$n=\log \eta^*(5)-\log \eta^*(50) \qquad (1)$$

wherein n represents the Newtonian viscosity index, $\eta^*(5)$ represents the complex dynamic viscosity (unit: Pa·s) measured under conditions of a temperature of 250° C. and an angular frequency of 5 rad/sec, and $\eta^*(50)$ represents the complex dynamic viscosity (unit: Pa·s) measured under conditions of a temperature of 250° C. and an angular frequency of 50 rad/sec; and (iv) has an average particle diameter of 1 mm or less.

The present invention is as follows:

(2) the thermoplastic polymer powder according to item (1), wherein the melt viscosity measured with a rotary viscometer at 250° C. and a shear rate of 0.2 sec$^{-1}$ is 3000 Pa·s or less;

(3) the thermoplastic polymer powder according to item (1) or (2), which is obtained by an underwater cutting process or a shock pulverizing process;

(4) the thermoplastic polymer powder according to any one of items (1) to (3), wherein the weight average molecular weight of the acrylic block copolymer (I) is from 5,000 to 200,000;

(5) the thermoplastic polymer powder according to any one of items (1) to (4), wherein the weight average molecular weight of the acrylic ester polymer block(s) (A) constituting the acrylic block copolymer (I) is from 1,000 to 150,000, and the weight average molecular weights of the methacrylic ester polymer block(s) (B) and the acrylic ester polymer block(s) (C) are from 2,000 to 50,000;

(6) the thermoplastic polymer powder according to any one of items (1) to (5), wherein the acrylic block copolymer (I) is a triblock copolymer made of the methacrylic ester polymer block (B)—the acrylic ester polymer block (A)—the methacrylic ester polymer block (B);

(7) the thermoplastic polymer powder according to any one of items (1) to (6), wherein the difference between the solubility parameter $\sigma(A)$ (unit: MPa$^{1/2}$) of the starting monomer(s) constituting the acrylic ester polymer block(s) (A) and the solubility parameter $\sigma(B)$ or $\sigma(C)$ (unit: MPa$^{1/2}$) of the starting monomer(s) constituting the methacrylic ester polymer block(s) (B) or the acrylic ester polymer block(s) (C) is 2.5 or less; and (8) the thermoplastic polymer powder according to any one of items (1) to (7), which is for slush molding or rotational molding.

Furthermore, the present invention is as follows:

(9) a process for producing a molded product by performing slush molding or rotational molding by use of the thermoplastic polymer powder according to any one of items (1) to (8);

(10) a molded product produced by use of the thermoplastic polymer powder according to any one of items (1) to (8);

(11) the molded product according to item (10), which is a toy member having a JIS-A hardness of 40 to 95; and

(12) the molded product according to item (10), which is a lighting cover having a JIS-A hardness of 95 or more.

BEST MODES FOR CARRYING OUT THE INVENTION

The present invention will be described in detail hereinafter.

The thermoplastic polymer powder of the invention is a thermoplastic powder which is made mainly of the acrylic block copolymer (I) [the above-mentioned requirement (i)], satisfies the dynamic viscosity properties prescribed in the above-mentioned (ii) and (iii), and further has an average particle diameter of 1 mm or less [the above-mentioned requirement (iv)]. As long as the thermoplastic polymer powder of the invention satisfies the above-mentioned requirements (i) to (iv), the powder may be a powder made only of the acrylic block copolymer (I) or a powder made of an acrylic block copolymer (I) composition wherein a different component (such as a different polymer or an additive) is incorporated into the acrylic block copolymer (I).

The acrylic block copolymer (I) constituting the thermoplastic polymer powder of the present invention is a block copolymer comprising one or more acrylic ester polymer blocks (A); and one or more polymer blocks bonded thereto and selected from methacrylic ester polymer blocks (B) and acrylic ester polymer blocks (C), which are different in structure from the acrylic ester polymer blocks (A).

In each of the acrylic ester polymer blocks (A) constituting the acrylic block copolymer (I), the ratio by mole of structural units originating from an acrylic ester to all structural units constituting the polymer block (A) is preferably 60% or more by mole from the viewpoint of flexibility, and is more preferably from 80 to 100% by mole.

Examples of the acrylic ester, which constitutes the acrylic ester polymer block (A), include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. The acrylic ester polymer block(s) (A) may be made of one or more out of these acrylic esters.

It is preferable that the acrylic ester polymer block(s) (A) is made of one or more out of ethyl acrylate, n-propyl acrylate, isopropyl acrylate, n-butyl acrylate, 2-ethylhexyl acrylate, pentadecyl acrylate, dodecyl acrylate, and 2-methoxyethyl acrylate among the above-mentioned esters since the flexibility of the molded product, the skin material, the painted film, and the like that are obtained by use of the thermoplastic polymer powder of the present invention. It is more preferable that the block(s) (A) is made of one or more out of ethyl acrylate, n-propyl acrylate, n-butyl acrylate, and 2-ethylhexyl acrylate. It is even more preferable that the block(s) (A) is made of one or more out of n-butyl and 2-ethylhexyl acrylate.

In each of the methacrylic ester polymer blocks (B), the ratio by mole of structural units originating from a methacrylic ester is 60% or more by mole from the viewpoint of heat resistance, and is more preferably from 80 to 100% by mole.

Examples of the methacrylic ester, which constitutes the methacrylic ester polymer block (B), include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, and 2-methoxyethyl methacrylate. The methacrylic ester polymer block(s) (B) may be made of one or more out of these methacrylic esters. It is preferable that the methacrylic ester polymer block(s) (B) is made of one or more out of methyl methacrylate, ethyl methacrylate, isopropyl methacrylate, n-butyl methacrylate, tert-butyl methacrylate, cyclohexyl methacrylate, and isobornyl methacrylate among the above-mentioned esters since the heat resistance of the molded product, the skin material, the painted film, and the like that are obtained by use of the thermoplastic polymer powder of the present invention becomes better. It is particularly preferable that the block(s) (B) is made of methyl methacrylate.

In each of the acrylic ester polymer blocks (C), which are made of acrylic ester units different in structure from the acrylic ester polymer constituting the acrylic ester polymer block(s) (A), the ratio by mole of structural units originating from an acrylic ester is preferably 60% or more by mole from the viewpoint of heat resistance, and is more preferably from 80 to 100% by mole.

Examples of the acrylic ester, which constitutes the acrylic ester polymer block (C), include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. The acrylic ester polymer block(s) (C) may be made of one or more out of these acrylic esters. It is necessary, however, that the structural units of the acrylic ester polymer block(s) (C) are different from those of the acrylic ester polymer block(s) (A).

If necessary, the acrylic ester polymer block(s) (A), the methacrylic ester polymer block(s) (B) and/or the acrylic ester polymer block(s) (C), which constitute the acrylic block copolymer (I), may comprise a small amount of a structural unit (monomer unit) originating from a different monomer as long as properties of each of the polymer blocks are not taken away from. The kind of the different monomer unit which the acrylic ester polymer block(s) (A), the methacrylic ester polymer block(s) (B) and/or the acrylic ester polymer block(s) (C) may comprise is not particularly limited. Examples thereof include structural units originating from unsaturated carboxylic acids such as methacrylic acid, acrylic acid and maleic anhydride; olefins such as ethylene, propylene, 1-butene, isobutylene, and 1-octene; conjugated diene compounds such as butadiene, isoprene, and myrcene; aromatic vinyl compounds such as styrene, α-methylstyrene, p-methylstyrene, and m-methylstyrene; and vinyl acetate, vinylpyridine, acrylonitrile, methacrylonitrile, vinyl ketone, vinyl chloride, vinylidene chloride, vinylidene fluoride, acrylamide, and methacrylamide. One or more out of these monomer units may be contained.

In the acrylic block copolymer (I), the number of bonds between the acrylic ester polymer block(s) (A), and the methacrylic ester polymer block(s) (B) and/or the acrylic ester polymer block(s) (C), and the structure of the bonds are not limited if the number and the structure give the thermoplastic polymer powder satisfying the dynamic viscosity properties prescribed in the above-mentioned (ii) and (iii). Since the molded product, the skin material, the painted film and the like that are formed by use of the thermoplastic polymer powder of the present invention become better in flexibility, the acrylic block copolymer (I) is preferably a diblock copolymer represented by the following general formula (1) or a triblock copolymer represented by the following general formula (2) or (3), and is more preferably a triblock copolymer represented by the following general formula (3):

A-B, (1)

C-A-B, (2)

and

B-A-B (3)

wherein A represents an acrylic ester polymer block (A), B represents a methacrylic ester polymer block (B), and C represents an acrylic ester polymer block (C) made of acrylic ester structural units different in structure from the structural units constituting the acrylic ester polymer block (A).

In the diblock copolymer represented by the general formula (1), the triblock copolymer represented by the general formula (2), and the triblock copolymer represented by the general formula (3), it is preferable that A is an acrylic ester polymer block (A) having a glass transition temperature of lower than 20° C., B is a methacrylic ester polymer block (B) having a glass transition temperature of 20° C. or higher, and C is an acrylic ester polymer block (C) having a glass transition temperature of 20° C. or higher.

The difference between the solubility parameter σ(A) (unit: $MPa^{1/2}$) of the monomer(s) constituting the acrylic ester polymer block (A) and the solubility parameter σ(B) or σ(C) of the starting monomer(s) constituting the methacrylic ester polymer block(s) (B) or the acrylic ester polymer block(s) (C) is preferably 2.5 or less, more preferably 2.0 or less, even more preferably 1.5 or less.

The solubility parameter referred to in the present invention, which may be referred to as the "SP value" hereinafter, can be calculated by the method described in "POLYMER HANDBOOK Fourth Edition", VII, pp. 675-714 (published by Wiley Interscience Co. in 1999) and "Polymer Engineering and Science", 1974, Vol. 14, pp. 147-154. When the SP values of main monomers which are preferably used in the present invention are obtained [the SP values are each described in the following parentheses], the results are as follows: methyl methacrylate (18.3), n-butyl acrylate (18.0), and 2-ethylhexyl acrylate (17.6).

In general, any block copolymer having polymer blocks wherein monomers having different SP values are structural units has a micro phase separation structure, and exhibits a non-Newtonian viscosity. Even block copolymers have no micro phase separation structure (disorder state) to exhibit the Newtonian viscosity if polymer blocks therein are soluble in each other. In order for the block copolymer in the invention to have a low melt viscosity under low shearing and have fluidity even under no applied fashioning pressure, it is preferable that the copolymer exhibits the Newtonian viscosity in the state that the copolymer is melted. When the difference between the SP values of the monomers which are structural units constituting the respective polymer blocks is small, the order/disorder transition temperature of the block copolymer can be made low so that the block copolymer can be favorably molded within the temperature range that the copolymer exhibits the Newtonian viscosity. On the other hand, if the difference between the SP values of the monomers which are structural units constituting the respective polymer blocks is large, the order/disorder transition temperature of the block copolymer tends to become higher than the decomposition temperature of the block copolymer so that the copolymer is not unfavorably molded with ease at a temperature that the copolymer is turned into a disorder state.

Specific and preferable examples of the acrylic block copolymer (I) include diblock copolymers such as [poly(n-butyl acrylate)]-[poly(methyl methacrylate)] and [poly(2-ethylhexyl acrylate)]-[poly(methyl methacrylate)]; and triblock copolymers such as [poly(methyl acrylate)]-[poly(n-butyl acrylate)-poly(methyl acrylate)], [poly(methyl acrylate)]-[poly(2-ethylhexyl acrylate)-poly(methyl methacrylate)], [poly(methyl methacrylate)]-[poly(ethyl acrylate)-[poly(methyl methacrylate)], [poly(methyl methacrylate)]-[poly(n-butyl acrylate)-poly(methyl methacrylate)], and [poly(methyl methacrylate)]-[poly(2-ethylhexyl acrylate)-[poly(methyl methacrylate)]. Of these, triblock copolymers made of [poly(methyl methacrylate)]-[poly(n-butyl acrylate)-poly(methyl methacrylate)], and [poly(methyl methacrylate)]-[poly(2-ethylhexyl acrylate)-[poly(methyl methacrylate)] are particularly preferable since the molded product, the skin material, the painted film, and the like that are obtained from the thermoplastic polymer powder of the present invention are better in flexibility.

The ratio of each of the polymer blocks contained in the acrylic block copolymer (I) is not particularly limited. The ratio of the acrylic ester polymer block(s) (A) is preferably from 20 to 95% by mass, more preferably from 30 to 80% by mass of the acrylic block copolymer (I) to make good the melt fluidity of the thermoplastic polymer powder of the present invention and make good the flexibility of the molded product, the skin material, the painted film, and the like that are obtained therefrom.

In order to make better the heat resistance of the molded product, the skin material, the painted film, and the like that are obtained from the thermoplastic polymer powder of the present invention, the ratio of the methacrylic ester polymer block(s) (B) is preferably from 5 to 80% by mass, in particular preferably from 20 to 70% by mass of the acrylic block copolymer (I) [in the case that the copolymer comprises no acrylic ester polymer block (C)], the total ratio of the methacrylic ester polymer block(s) (B) and the acrylic ester polymer block(s) (C) is preferably from 5 to 80% by mass, in particular preferably from 20 to 70% by mass of the copolymer (I) [in the case that the copolymer (I) comprises both of the methacrylic ester polymer block(s) (B) and the acrylic ester polymer block(s) (C)], or the ratio of the acrylic ester polymer block(s) (C) is preferably from 5 to 80% by mass, in particular preferably from 20 to 70% by mass of the copolymer (I) [in the case that the copolymer (I) comprises no methacrylic ester polymer block (B)].

The molecular weight of each of the polymer blocks constituting the acrylic block copolymer (I) may be any value that gives the dynamic viscosity properties prescribed in the (ii) and (iii) to the thermoplastic polymer powder of the present invention. In general, the weight average molecular weight of the acrylic ester polymer block(s) (A) is preferably from 1,000 to 150,000, in particular preferably from 5,000 to 80,000, and the weight average molecular weights of the methacrylic ester polymer block(s) (B) and the acrylic ester polymer block(s) (C) are preferably from 2,000 to 50,000, in particular preferably from 5,000 to 25,000.

The molecular weight of the whole of the acrylic block copolymer (I) may be any value that gives the dynamic viscosity properties prescribed in the (ii) and (iii) to the thermoplastic polymer powder of the present invention. In general, the weight average molecular weight thereof is preferably from 5,000 to 200,000, more preferably from 10,000 to 100,000.

In the case that the acrylic block copolymer (I) is the above-mentioned triblock copolymer made of [poly(methyl methacrylate)]-[poly(n-butyl acrylate)-poly(methyl methacrylate)] or [poly(methyl methacrylate)]-[poly(2-ethylhexyl acrylate)-[poly(methyl methacrylate)], the weight average molecular weight of the poly(methyl methacrylate) block corresponding to one of the methacrylic ester polymer blocks (B) is preferably from 2,000 to 25,000, in particular preferably from 5,000 to 15,000 since the melt fluidity of the thermoplastic polymer powder of the present invention becomes good and further the flexibility of the molded product, the skin material, the painted film, and the like that are obtained by use of the thermoplastic polymer powder becomes good.

In particular, in the case that the weight average molecular weight of the poly(methyl methacrylate) block corresponding to one of the methacrylic ester polymer blocks (B) is from 6,000 to 13,000 and the molecular weight of the whole of the acrylic block copolymer (I) is from 30,000 to 70,000, the thermoplastic polymer powder of the invention is very good in melt fluidity and has an excellent moldability even if no fluidity improver, plasticizer or the like is added thereto.

The acrylic block copolymer (I) constituting the thermoplastic polymer powder of the invention can be produced according to any known method for producing an acrylic block copolymer. For example, a method of living-polymerizing monomers constituting the respective blocks is generally used. Examples of such a living-polymerizing method include a method of subjecting the monomers to anionic polymerization in the presence of a mineral acid salt, such as an alkali metal or alkaline earth metal salt, using an organic alkali metal compound as a polymerization initiator (see JP-B-7-25859); a method of subjecting the monomers to anionic polymerization in the presence of an organic aluminum compound, using an organic alkali metal compound as a polymerization initiator (see JP-A-11-335432); a method of polymerizing the monomers, using an organic rare earth metal complex as a polymerization initiator (see JP-A-6-93060); and a method of radical-polymerizing the monomers in the presence of a copper compound, using an α-halogenated ester compound as an initiator (see "Macromolecular Chemical Physics", 2000, Vol. 201, pp. 1108-1114). Other examples thereof include a method of using a polyvalent radical polymerization initiator or polyvalent radical chain transfer agent to polymerize monomers constituting the respective blocks, thereby producing a mixture containing the acrylic block copolymer (I) constituting the thermoplastic polymer powder of the invention.

Of these methods, the method of using an organic alkali metal compound as a polymerization initiator to subject the monomers to anionic polymerization in the presence of an organic aluminum compound is preferably adopted since the method makes it possible to yield the acrylic block copolymer (I) with a high purity, causes the molecular weight and the composition ratio to be easily controlled and is further economical.

The thermoplastic polymer powder of the present invention needs to have a complex dynamic viscosity $\eta^*(5)$ of $5.0 \times 10^3$ Pa·s or less, the viscosity $\eta^*(5)$ being measured under conditions of a temperature of 250° C. and an angular frequency of 5 rad/sec [the above-mentioned requirement (ii)]. The complex dynamic viscosity $\eta^*(5)$ is preferably $1.0 \times 10^3$ Pa·s or less, more preferably $5.0 \times 10^2$ Pa·s or less. If the complex dynamic viscosity $i^*(5)$ at a temperature of 250° C. and a frequency of 5 rad/sec is more than $5.0 \times 10^3$ Pa·s, the thermoplastic polymer powder is not melted on the surface of a mold so that the powder becomes unsuitable for powder slush molding, which is performed in the state that the shear rate is a very low value of 1 sec$^{-1}$ or less and fashioning pressure is not substantially applied thereto.

Furthermore, the thermoplastic polymer powder of the invention needs to have a Newtonian viscosity index n of 0.50 or less [the above-mentioned requirement (iii)], the index n being represented by the following equation (1):

$$n = \log \eta^*(5) - \log \eta^*(50) \quad (1)$$

wherein n represents the Newtonian viscosity index, $\eta^*(5)$ represents the complex dynamic viscosity (unit: Pa·s) measured under conditions of a temperature of 250° C. and an angular frequency of 5 rad/sec, and $\eta^*(50)$ represents the complex dynamic viscosity (unit: Pa·s) measured under conditions of a temperature of 250° C. and an angular frequency of 50 rad/sec. The Newtonian viscosity index n is preferably 0.30 or less, more preferably 0.20 or less.

In the case that the Newtonian viscosity index n of the thermoplastic polymer powder is more than 0.50, the frequency dependency of the complex dynamic viscosity is large even if the viscosity $I^*(5)$ measured under conditions of a temperature of 250° C. and an angular frequency of 5 rad/sec is $5.0 \times 10^3$ Pa·s or less. As a result, thermal fusion between the melted thermoplastic polymer powder particles becomes incomplete in molding methods, such as slush molding, wherein the shear rate is a very low value of 1 sec$^{-1}$ or less when the powder is molded or the fashioning pressure is a small value of 1 kg/cm$^2$ or less when the powder is molded. Consequently, only a molded product poor in mechanical properties is obtained.

The complex dynamic viscosity $\eta^*(5)$ (unit: Pa·s) of the thermoplastic polymer powder of the invention, which is measured under conditions of a temperature of 250° C. and an angular frequency of 5 rad/sec, and the complex dynamic viscosity $\eta^*(50)$ (unit: Pa·s) thereof, which is measured under conditions of a temperature of 250° C. and an angular frequency of 50 rad/sec, are each a value when an ARES viscoelasticity measuring system manufactured by Rheometric Scientific Co. is used to measure the dynamic viscosity of the thermoplastic polymer powder itself under a condition of a temperature of 250° C. and an angular frequency of 5 rad/sec or 50 rad/sec before the powder is turned into a molded product. Details thereof are as described in the paragraph of Examples, which will be described later.

About the thermoplastic polymer powder of the invention, the melt viscosity measured under conditions of a temperature of 250° C. and a shear rate of 0.2 sec$^{-1}$ is preferably 3000 Pa·s or less, more preferably 2000 Pa·s or less, even more preferably 1500 Pa·s or less.

If the melt viscosity measured under conditions of a temperature of 250° C. and a shear rate of 0.2 sec$^{-1}$ is 3000 Pa·s or more, the thermoplastic polymer powder is easily not melted on the surface of a mold so that the powder easily becomes unsuitable for slush molding, which is performed in the state that the shear rate is a very low value of 1 sec$^{-1}$ or less and fashioning pressure is not substantially applied thereto.

The average particle diameter of the thermoplastic polymer powder of the invention is indispensably 1 mm or less, preferably 800 μm or less, more preferably from 50 to 500 μm. If the average particle diameter of the thermoplastic polymer powder is more than 1 mm, the powder fluidity or the weighability of the powder easily gets poor when the powder is subjected to slush molding, rotational molding, some other molding using the powder, powder coating, or the like. As a result, a molded product, a skin material, a painted film or the like that has a high quality is not easily obtained. In the case that the thermoplastic polymer powder of the invention is used, in particular, in slush molding, it is preferred that the average particle diameter of the thermoplastic polymer powder is from 50 to 500 μm from the viewpoint of good working conditions, the evenness of the thickness of the resultant molded product, the prevention of the generation of pinholes, mechanical strength, and others.

The average particle diameter of the thermoplastic polymer powder in the present specification means average particle diameter measured with a scattering system particle size distribution measuring device (for example, "LA-920" manufactured by HORIBA).

As long as the thermoplastic polymer powder of the invention satisfies the above-mentioned requirements (i) to (iv), the powder may be a powder made only of the acrylic block copolymer (I) or a powder made of an acrylic block copolymer (I) composition wherein a different component (such as a different polymer or an additive) is incorporated into the acrylic block copolymer (I).

In the case that the thermoplastic polymer powder of the invention is made of an acrylic block copolymer (I) composition which comprises the acrylic block copolymer (I) and a different polymer, the content by percentage of the different polymer can be varied by the kind of the different polymer and so on and generally the content is preferably 40% by mass or less of the acrylic block copolymer (I) composition since the advantageous effects which the thermoplastic polymer powder of the invention has are not taken away from. The content is more preferably 20% by mass or less.

Examples of the different polymer, which the thermoplastic polymer powder of the invention may comprise together with the acrylic block copolymer (I), include olefin resins such as polyethylene, polypropylene, polybutene-1, poly-4-methylpentene-1, and polynorbornene; ethylene-based ionomers; styrene-based resins such as polystyrene, styrene/maleic anhydride copolymer, high impact polystyrene, AS resin, ABS resin, AES resin, AAS resin, ACS resin, and MBS resin; acrylic resins such as polymethyl methacrylate; methyl methacrylate/styrene copolymer; polyester resins such as polyethylene terephthalate and polybutylene terephthalate; polyamides such as nylon 6, nylon 66, and polyamide elastomer; polycarbonate, polyvinyl chloride, polyvinylidene chloride, polyvinyl alcohol, ethylene/vinyl alcohol copolymer, polyacetal, polyvinylidene fluoride, polyurethane, modified polyphenyleneether, polyphenylenesulfide, silicone rubber modified resin; acrylic rubbers; silicone rubbers; styrene-based thermoplastic rubbers such as SEPS, SEBS and SIS; and rubbers such as IR, EPR and EPDM. The powder may comprise one or more out of these polymers. Of these polymers, acrylic resins are preferably used since they are excellent in compatibility with the acrylic block copolymer (I), which is a constituent of the thermoplastic polymer powder.

Examples of the additive, which may be contained in the thermoplastic polymer powder of the invention if necessary, include a lubricant, a fluidity improver, a plasticizer (softener), a thermal stabilizer, a weatherability improver, an antioxidant, a light stabilizer, an antistatic agent, a flame retardant, an adhesive agent, a tackifier, a foaming agent, a pigment, a dye, a filler, and a reinforcing agent. More specific examples thereof include mineral oil softeners, such as paraffin oil and naphthene oil, for improving the fluidity when the powder is molded; inorganic fillers, such as calcium carbonate, talc, carbon black, titanium oxide, silica, clay, barium sulfate, and magnesium carbonate, for attaining an improvement in heat resistance, weatherability or the like, an increase in weight, and other objects; and inorganic or organic fibers, such as glass fiber and carbon fiber, for reinforcement. In order to make the heat resistance and the weatherability better, it is practically preferred that the thermoplastic polymer powder of the invention comprises a thermal stabilizer, an antioxidant or the like among these additives.

Even if the acrylic block copolymer (I) alone does not satisfy the (ii) or (iii), the incorporation of a fluidity improver or plasticizer may make it possible to yield a powder exhibiting good fluidity. In particular, the incorporation of a fluidity improver or plasticizer having an SP value close to the SP value of the monomers which are polymer block constituent units which constitute the acrylic block copolymer (I) makes it possible to yield, in many cases, a powder which satisfies the requirements (ii) and (iii) and is excellent in melt fluidity while preventing bleed-out and fogging. Examples of the fluidity improver or plasticizer that is preferably used at this time include phosphoric acid derivatives such as tricresyl phosphate (21.4); citric acid derivatives such as acetyl tri(n-butyl) citrate (20.1); sebacic acid derivatives such as di(2-ethylhexyl) sebacate (18.1); adipic acid derivatives such as diisononyl adipate (18.2); phthalic acid derivatives such as diisononyl phthalate (19.2); and polyester oligomers and poly(meth)acrylic ester oligomers [the values inside the parentheses are SP values]. The use of acetyl tri(n-butyl) citrate out of these is more preferred from the viewpoint of bleed-out resistance and safety. When the fluidity improver or plasticizer is incorporated, the incorporated amount thereof is preferably 300 parts or less by mass, more preferably 150 parts or less by mass for 100 parts by mass of the acrylic block copolymer (I).

In the case that the thermoplastic polymer powder is made only of the acrylic block copolymer (I) without containing any different polymer or additive, the process for producing the thermoplastic polymer powder of the invention is, for example, a process of making the acrylic block copolymer (I) obtained by polymerization directly into a powder in an appropriate manner, and optionally classifying the powder by use of a sieve or the like.

In the case that the thermoplastic polymer powder of the present invention is made of an acrylic block copolymer (I) composition comprising the acrylic block copolymer (I) together with a different polymer and/or an additive, the mixing may be the respective components constituting the composition collectively or separately, and the kneading may be the resultant mixture by use of a conventional kneading machine such as a single screw extruder, a twin screw extruder, a Banbury mixer, a Brabender, an open roll or kneader, so as to prepare, for example, a pellet-form acrylic block copolymer (I), next making the resultant into a powder in an appropriate manner, and optionally classifying the powder with a sieve or the like.

At the time of the kneading for obtaining the acrylic block copolymer (I) composition, this composition can be made homogenous by dry-blending respective components to be kneaded by use of a mixer such as a Henschel mixer or a tumbler before the kneading, and then supplying the resultant into a kneading machine without supplying the components directly into the kneading machine. The temperature for kneading the acrylic block copolymer (I) composition can be appropriately adjusted in accordance with the melting temperature of the used acrylic block copolymer (I) and other factors. Usually, the components may be kneaded within a temperature ranging from 110 to 300° C.

In the above description, the method for making the acrylic block copolymer (I) itself or the acrylic block copolymer (I) composition into a powder is not particularly limited, and may be any method that is used at the time of making a thermoplastic polymer composition into a powder. For example, the following may be used; a method of using an impact pulverizing machine such as a turbo mill, a pin mill, a hummer mill, or a rotor speed mill to pulverize the acrylic block copolymer (I) itself or a lump or pellets of the acrylic block copolymer (I) composition at ambient temperature or under frozen conditions; a method of heating and melting the acrylic block copolymer (I) itself or the acrylic block copolymer (I) composition, spraying the resultant with a spray device, a disk atomizer or the like, and then cooling the sprayed material; a method of extruding the acrylic block copolymer (I) itself or the acrylic block copolymer (I) composition through a micro-dice into water with an extruder, and then hot-cutting the resultant in the water; or the like.

Of the above-mentioned methods, the method of using an impact pulverizing machine to pulverize the copolymer or the composition at ambient temperature or under frozen conditions is preferably adopted since facilities therefor are inexpensive and the production is easy.

The process of extruding the copolymer or composition through a micro-dice into water and then hot-cutting the resultant in the water is advantageous, in particular, in the case that the thermoplastic polymer powder is made of the acrylic block copolymer (I) composition. This is because the acrylic block copolymer (I) composition can be prepared and simultaneously made into a powder by use of an extruder. In the case of the method of extruding the copolymer or composition through a micro-dice into water and then hot-cutting the resultant in the water, the extruded product is oriented to a high degree by shearing applied at the time of the extrusion from the micro-dice; accordingly, the powder obtained by cutting it is less agglutinated so as to have excellent powder fluidity. From this point, the method is preferred.

In the case that a powder having an average particle diameter of 1 mm or less is directly obtained by the above-mentioned pulverizing method, the powder may be collected, as it is, as the thermoplastic polymer powder of the invention. In the case that the average particle diameter of the powder obtained by the above-mentioned pulverizing method is more than 1 mm or in the case that the average particle diameter is 1 mm or less and the diameter is desired to be made smaller, it is advisable to classify the powder obtained by the above-mentioned pulverizing method with a sieve, a duct collector or the like and then collect powder having an average particle size of 1 mm or less, or smaller powder.

The thermoplastic polymer powder of the invention can be used effectively for molding technique or coating technique using a powdery thermoplastic polymer or thermoplastic polymer powder composition. The thermoplastic polymer powder can be used in powder moldings such as slush molding, rotational molding, compression molding, powder flame spraying, extrusion molding and calendaring, and various coating techniques using powder (such as fluidized bed coating process, electrostatic coating, thermal spraying, and spray painting), and can be made into various molded products such as a sheet-form product, a film-form product, a hollow product and a laminate, a skin material, a painted film, a coating product, and so on. The thermoplastic polymer powder of the invention is particularly suitable for being used in slush molding and rotational molding.

For example, a skin material having an uneven pattern in a skin grain form, a stitch form or some other form, or having a complicated shape can be obtained by performing powder molding, such as slush molding, using the thermoplastic polymer powder of the invention. The molded product, the skin material, and the painted film, and the like that are obtained by use of the thermoplastic polymer powder of the invention is excellent in weatherability, and also excellent in flexibility, mechanical strength, low-temperature properties, rubber elasticity and others. Furthermore, the weatherability of the acrylic block copolymer (I), which is a constituent, is good, and thus the molded body and the like obtained therefrom are also excellent in weatherability. Additionally, the thermoplastic polymer powder does not contain any halogen such as chlorine or any plasticizer; therefore, environmental pollution is not caused when the powder is burned, so as not to cause an anxiety about carcinogenicity. Thus, the safety thereof and others are also excellent.

If necessary, the molded product, the skin material, the painted film and the like that are obtained by use of the thermoplastic polymer powder of the invention may be subjected to surface coating with, for example, polyurethane.

An article having a molded product, a skin material or a painted film obtained by use of the thermoplastic polymer powder of the invention makes good use of various properties such as superior flexibility, rubber elasticity, low-temperature properties, mechanical strength, weatherability, safety, and no inducement of environmental pollution, thereby making it possible that the article is effectively applied to various purposes, such as automobile interior members such as an instrument panel, a door trim, a console box, an arm rest, a head rest, a seat, a pillar, a steering wheel, and a ceiling; skin materials for a sofa and various chairs; sporting goods; leisure goods; stationery; lining for houses; mannequins; and others. In particular, the thermoplastic polymer powder having such a flexibility that the JIS-A hardness ranges from 40 to 95 can be used in particular suitably for toy members. The thermoplastic polymer powder having a JIS-A hardness of 95 or more can be effectively used for articles for which the weatherability and the transparency of the thermoplastic polymer powder are utilized, for example, outdoor parts such as a street light glove, eaves and a top cover; tanks such as a living fish tank, and an industrial tank; and a lighting cover.

EXAMPLES

The present invention will be specifically described by way of the following examples and so on. However, the present invention is not limited to the examples.

In each of the following examples, the weight average molecular weights of the whole of the block copolymer and the polymethyl methacrylate (PMMA) block, the constituting percentage of each of polymer blocks, the average particle diameter, the melt viscosity, the dynamic viscosity (complex dynamic viscosity), and the slush moldability of a thermoplastic polymer powder, the flexibility (hardness), the tensile strength and the elongation at break of the molded product obtained therefrom were measured or evaluated by the following methods:

(1) Weight Average Molecular Weights of the Whole of Block Copolymer, and PMMA Block:

In each of referential examples described below, the weight average molecular weights of the whole of the block copolymer and the PMMA block were obtained as molecular weights in terms of polystyrene by gel permeation chromatography (hereinafter referred to as GPC).

(2) Constituting Percentage of Each of Polymer blocks in Block Copolymer:

In each of referential examples described below, the constituting percentage of each of polymer blocks in the block copolymer was obtained by H-NMR measurement.

(3) Average Particle Diameter of Thermoplastic Polymer Powder:

The average particle diameter of the thermoplastic polymer powder obtained in each of the following examples and comparative examples was measured by use of a scattering system particle size measuring device ("LA-920" manufactured by HORIBA).

(4) Melt Viscosity of Thermoplastic Polymer Particles:

The thermoplastic polymer powder obtained in each of the following examples and comparative examples and a Brookfield viscometer (model number: RVDV-II+) manufactured by Brookfield Co. were used to measure the melt viscosity under conditions of a temperature of 250° C. and a shear rate of 0.2 sec$^{-1}$.

(5) Dynamic Viscoelasticity and Complex Dynamic Viscosity of Thermoplastic Polymer Powder:

The thermoplastic polymer powder obtained in each of the following examples and comparative examples and an ARES viscoelasticity measuring system manufactured by Rheometric Scientific Co. were used to measure the dynamic viscoelasticities at a temperature of 250° C. and angular frequencies of 5 rad/sec and 50 rad/sec. From the resultant dynamic viscoelasticity values, the complex dynamic viscosities $\eta^*(5)$ and $\eta^*(50)$ were calculated. The measurement of the dynamic viscoelasticities was made in a parallel flat plate mode (dynamic frequency sweep; the use of plates of 25 mm in diameter). The applied strain was 0.5%.

The Newtonian viscosity index n was calculated on the basis of the above-mentioned equation (1), using the values of the complex dynamic viscosities $\eta^*(5)$ and $\eta^*(50)$ calculated above.

(6) Slush Moldability:

The external appearance and the surface state of the sheet-form molded product of 1 mm thickness obtained by slush molding in each of the following examples and comparative examples were evaluated by visual check, and then the slush moldability thereof was evaluated in accordance with the following evaluation criterion:

[Evaluation Criterion of the Slush Moldability]

◉: The obtained sheet-form molded product exhibited a very smooth surface state.

○: The obtained sheet-form molded product exhibited a good surface state and had no pinholes.

x: Irregularities in the surface were conspicuous and a large number of pinholes were observed.

(7) Flexibility (Hardness) of Molded Product:

About the sheet-form molded product of 1 mm thickness obtained by slush molding in each of the following examples and comparative examples, the flexibility (hardness) was measured in accordance with JIS K 6253. Specifically, a type A hardness meter (KOBUNSHI KEIKI CO., LTD.) was used to make a durometer hardness test, thereby measuring the hardness.

(8) Tensile Strength and Elongation at Break of Molded Product:

From the sheet-form molded product of 1 mm thickness obtained by slush molding in each of the following examples and comparative examples, a test piece was punched out with a JIS No. 3 punching blade. The tensile strength and the elongation at break were measured in accordance with JIS K 6251.

Referential Example 1

Synthesis of Acrylic Block Copolymer (1) A 1-liter three-necked flask was equipped with a three-way stopcock, and the inside thereof was degassed and purged with nitrogen. Thereafter, into the flask was charged with 278 g of toluene, 13.9 g of 1,2-dimethoxyethane, and 12.2 g of a toluene solution containing 8.18 mmol of isobutylbis(2,6-di-t-butyl-4-methylphenoxy)aluminum. Furthermore, 1.68 mmol of sec-butyllithium was added thereto. Thereto was added 17.0 g of methyl methacrylate, and then the components were caused to react at room temperature for 1 hour. One gram was collected as a sample 1out of this reaction solution. Subsequently, the inside temperature of the polymer solution was cooled to −30° C., and then 79.0 g of n-butyl acrylate was dropwise added thereto over 5 hours. One gram was collected as a sample 2 out of this reaction solution. Subsequently, thereto was added 17.0 g of methyl methacrylate, and the temperature of the reaction solution was raised to room temperature. The components therein were caused to react while the solution was stirred for 10 hours. This reaction solution was poured into a large amount of methanol, and the thus-obtained precipitate was separated and collected as an acrylic block copolymer [referred to as the "triblock copolymer (a)" hereinafter].

(2) The sample 1, the sample 2 and the triblock copolymer (a) obtained in the paragraph (1) were each subjected to GPC measurement and $^1$H-NMR measurement, and on the basis of the obtained results, the Mw (weight average molecular weight) of the whole, the Mw/Mn (molecular weight distribution) thereof, the ratio by mass between the polymethyl methacrylate (PMMA) blocks and the poly(n-butyl acrylate) (PnBA) block therein, and so on were obtained. As a result, the triblock copolymer (a) was a triblock copolymer made of block PMMA-block PnBA-block PMMA. The Mw of the PMMA blocks at both ends of this triblock copolymer (a) was 10,400, and the Mw/Mn thereof was 1.07. The Mw of the whole of the triblock copolymer (a) was 77,000 and the Mw/Mn thereof was 1.10. The percentage of each of the polymer blocks was as follows: PMMA (15% by mass)-PnBA (70% by mass)-PMMA (15% by mass).

Referential Example 2

Synthesis of Acrylic Block Copolymer

A triblock copolymer made of block PMMA-block PnBA-block PMMA [hereinafter referred to as the "triblock copolymer (b)"] was produced by adopting the same method as in Referential Example 1 except that the amounts of the supplied monomers were changed.

The Mw of the PMMA blocks at both ends of this triblock copolymer (b) was 10,600, and the Mw/Mn thereof was 1.07. The Mw of the whole of the triblock copolymer (b) was 60,800 and the Mw/Mn thereof was 1.04. The percentage of each of the polymer blocks in this triblock copolymer (b) was as follows: PMMA (20% by mass)-PnBA (60% by mass)-PMMA (20% by mass).

Referential Example 3

Synthesis of Acrylic Block Copolymer

A triblock copolymer made of block PMMA-block PnBA-block PMMA [hereinafter referred to as the "triblock copolymer (c)"] was produced by adopting the same method as in Referential Example 1 except that the amounts of the supplied monomers were changed.

The Mw of the PMMA blocks at both ends of this triblock copolymer (c) was 7,100, and the Mw/Mn thereof was 1.13. The Mw of the whole of the triblock copolymer (c) was 82,000 and the Mw/Mn thereof was 1.13. The percentage of each of the polymer blocks in this triblock copolymer (c) was as follows: PMMA (12.5% by mass)-PnBA (75% by mass)-PMMA (12.5% by mass).

Referential Example 4

Synthesis of Acrylic Block Copolymer

A triblock copolymer made of block PMMA-block PnBA-block PMMA [hereinafter referred to as the "triblock copolymer (d)"] was produced by adopting the same method as in Referential Example 1 except that the amounts of the supplied monomers were changed.

The Mw of the PMMA blocks at both ends of this triblock copolymer (d) was 11,300, and the Mw/Mn thereof was 1.07. The Mw of the whole of the triblock copolymer (d) was 116,000 and the Mw/Mn thereof was 1.06. The percentage of each of the polymer blocks in this triblock copolymer (d) was as follows: PMMA (12.5% by mass)-PnBA (75% by mass)-PMMA (12.5% by mass).

Referential Example 5

Synthesis of Acrylic Block Copolymer

A triblock copolymer made of block PMMA-block PnBA-block PMMA [hereinafter referred to as the "triblock copolymer (e)"] was produced by adopting the same method as in Referential Example 1 except that the amounts of the supplied monomers were changed.

The Mw of the PMMA blocks at both ends of this triblock copolymer (e) was 8,300, and the Mw/Mn thereof was 1.08. The Mw of the whole of the triblock copolymer (e) was 54,000 and the Mw/Mn thereof was 1.07. The percentage of each of the polymer blocks in this triblock copolymer (e) was as follows: PMMA (17.5% by mass)-PnBA (65% by mass)-PMMA (17.5% by mass).

Referential Example 6

Synthesis of Acrylic Block Copolymer

A triblock copolymer made of block PMMA-block PnBA-block PMMA [hereinafter referred to as the "triblock copolymer (f)"] was produced by adopting the same method as in Referential Example 1 except that the amounts of the supplied monomers were changed.

The Mw of the PMMA blocks at both ends of this triblock copolymer (f) was 10,900, and the Mw/Mn thereof was 1.12. The Mw of the whole of the triblock copolymer (f) was 37,000 and the Mw/Mn thereof was 1.08. The percentage of each of the polymer blocks in this triblock copolymer (f) was as follows: PMMA (30% by mass)-PnBA (40% by mass)-PMMA (30% by mass).

Referential Example 7

Synthesis of Acrylic Block Copolymer

A triblock copolymer made of block PMMA-block PnBA-block PMMA [hereinafter referred to as the "triblock copolymer (g)"] was produced by adopting the same method as in Referential Example 1 except that the amounts of the supplied monomers were changed.

The Mw of the PMMA blocks at both ends of this triblock copolymer (g) was 7,600, and the Mw/Mn thereof was 1.14. The Mw of the whole of the triblock copolymer (g) was 49,000 and the Mw/Mn thereof was 1.10. The percentage of each of the polymer blocks in this triblock copolymer (g) was as follows: PMMA (15% by mass)-PnBA (70% by mass)-PMMA (15% by mass).

The details of the acrylic block copolymers obtained in the above-mentioned Referential Examples 1 to 7 are as shown in the following Table 1.
Table 1

Example 1

Production and Slush Molding of Thermoplastic Polymer Powder (1) An impact pulverizer ("Rotor Speed Mill P-14", manufactured by Fritsche Co.) was used to pulverize the triblock copolymer (a) obtained in Referential Example 1 at a temperature of −100° C., and then the pulverized product was classified with a 32-mesh sieve (sieve opening: 0.495 mm). The powder which passed through the sieve was collected as a thermoplastic polymer powder.

The average particle diameter and the melt viscosity of the resultant thermoplastic polymer powder were measured by the above-mentioned methods. The results are as shown in Table 2 described below.

The complex dynamic viscosity $\eta^*(5)$ and the complex dynamic viscosity $\eta^*(50)$ of the resultant thermoplastic polymer powder were calculated by the above-mentioned method, and further the Newtonian viscosity index n thereof was obtained from these values on the basis of the above-mentioned equation (1). The results are as shown in Table 2.

(2) The thermoplastic polymer powder obtained in the paragraph (1) was uniformly sprinkled on a mold made of a nickel electroformed plate (length×width×thickness=150 mm×150 mm×1 mm) having a surface temperature of 250° C. The powder was kept at the same temperature for 30 seconds in the state that the powder was allowed to stand still. In this way, the thermoplastic polymer powder was melted and stuck thereto, and subsequently the electroformed plate was rotated, thereby discharging the powder that was not melted or stuck. The electroformed plate onto which the thermoplastic polymer powder was melted and stuck was kept in a heating furnace of 250° C. temperature for 3 minutes, so as to melt the powder. Next, the resultant was taken out from the heating furnace and cooled to 40° C. with water, and then the polymer was removed from the mold, so as to produce a sheet-form molded product (slush molded product) of 1 mm thickness. The slush moldability at this time was evaluated by the above-mentioned method. The result is as shown in Table 2.

(3) A given test piece was obtained from the sheet-form molded product obtained in the paragraph (2), and the flexibility (hardness), the tensile strength and the elongation at break thereof were measured by the above-mentioned methods. The results are as shown in Table 2.

Example 2

Production and Slush Molding of Thermoplastic Polymer Powder (1) An extruder was used to extrude the triblock copolymer (a) obtained in Referential Example 1 through a micro-dice having pores of 500 μm diameter into water. Underwater palletizing systems (manufactured by Gala Co.) were used to hot-cut the extruded copolymer in water (at a temperature of 80° C.), thereby producing a thermoplastic polymer powder.

The average particle diameter and the melt viscosity of the resultant thermoplastic polymer powder were measured by the above-mentioned methods. The results are as shown in Table 2.

The complex dynamic viscosity $\eta^*(5)$ and the complex dynamic viscosity $\eta^*(50)$ of the resultant thermoplastic polymer powder were calculated by the above-mentioned method, and further the Newtonian viscosity index n thereof was obtained from these values on the basis of the above-mentioned equation (1). The results are as shown in Table 2.

(2) The thermoplastic polymer powder obtained in the paragraph (1) was used to perform slush molding in the same way as in the paragraph (2) of Example 1, thereby producing a sheet-form molded product of 1 mm in thickness. The slush moldability at this time was evaluated by the above-mentioned method. The result is as shown in Table 2.

(3) A given test piece was obtained from the sheet-form molded product obtained in the paragraph (2), and the flexibility (hardness), the tensile strength and the elongation at break thereof were measured by the above-mentioned methods. The results are as shown in Table 2.

Example 3

Production and Slush Molding of Thermoplastic Polymer Powder (1) A thermoplastic polymer powder was produced in the same way as in the paragraph (1) of Example 1 except that the triblock copolymer (b) obtained in Referential Example 2 was used.

The average particle diameter and the melt viscosity of the resultant thermoplastic polymer powder were measured by the above-mentioned methods. The results are as shown in Table 2.

The complex dynamic viscosity $\eta^*(5)$ and the complex dynamic viscosity $\eta^*(50)$ of the resultant thermoplastic polymer powder were calculated by the above-mentioned method, and further the Newtonian viscosity index n thereof was obtained from these values on the basis of the above-mentioned equation (1). The results are as shown in Table 2.

(2) The thermoplastic polymer powder obtained in the paragraph (1) was used to perform slush molding in the same way as in the paragraph (2) of Example 1, thereby producing a sheet-form molded product of 1 mm in thickness. The slush moldability at this time was evaluated by the above-mentioned method. The result is as shown in Table 2.

(3) A given test piece was obtained from the sheet-form molded product obtained in the paragraph (2), and the flexibility (hardness), the tensile strength and the elongation at break thereof were measured by the above-mentioned methods. The results are as shown in Table 2.

Example 4

Production and Slush Molding of Thermoplastic Polymer Powder (1) Ninety parts by mass of the triblock copolymer (c) obtained in Referential Example 3 were mixed with 10 parts by mass of a methacrylic resin [Mw=37,000, Mw/Mn=1.6, and copolymerization ratio of methyl methacrylate to methyl acrylate=86:14 (ratio by mass)] as another component, and then the mixture was melted and kneaded in a Laboplast mill at 200° C., so as to prepare a triblock copolymer (c) composition.

(2) The triblock copolymer (c) composition obtained in the paragraph (1) was used to produce a thermoplastic polymer powder in the same way as in the paragraph (1) of Example 1.

The average particle diameter and the melt viscosity of the resultant thermoplastic polymer powder were measured by the above-mentioned methods. The results are as shown in Table 2.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 2.

(3) The thermoplastic polymer powder obtained in the paragraph (2) was used to perform slush molding in the same way as in the paragraph (2) of Example 1, thereby producing a sheet-form molded product of 1 mm in thickness. The slush moldability at this time was evaluated by the above-mentioned method. The result is as shown in Table 2.

(4) A given test piece was obtained from the sheet-form molded product obtained in the paragraph (3), and the flexibility (hardness), the tensile strength and the elongation at break thereof were measured by the above-mentioned methods. The results are as shown in Table 2.

Example 5

Production and Slush Molding of Thermoplastic Polymer Powder (1) A thermoplastic polymer powder was produced in the same way as in the paragraph (1) of Example 3 except that the triblock copolymer (e) obtained in Referential Example 5 was used.

The average particle diameter and the melt viscosity of the resultant thermoplastic polymer powder were measured by the above-mentioned methods. The results are as shown in Table 2.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 2.

(2) The thermoplastic polymer powder obtained in the paragraph (1) was used to perform slush molding in the same way as in the paragraph (2) of Example 1, thereby producing a sheet-form molded product (slush molded product) of 1 mm in thickness. The slush moldability at this time was evaluated by the above-mentioned method. The result is as shown in Table 2.

(3) A given test piece was obtained from the sheet-form molded product obtained in the paragraph (2), and the flexibility (hardness), the tensile strength and the elongation at break thereof were measured by the above-mentioned methods. The results are as shown in Table 2.

Example 6

Production and Slush Molding of Thermoplastic Polymer Powder (1) A thermoplastic polymer powder was produced in the same way as in the paragraph (1) of Example 3 except that the triblock copolymer (f) obtained in Referential Example 6 was used.

The average particle diameter and the melt viscosity of the resultant thermoplastic polymer powder were measured by the above-mentioned methods. The results are as shown in Table 3.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 3.

(2) The thermoplastic polymer powder obtained in the paragraph (1) was used to perform slush molding in the same way as in the paragraph (2) of Example 1, thereby producing a sheet-form molded product of 1 mm in thickness. The slush moldability at this time was evaluated by the above-mentioned method. The result is as shown in Table 3.

(3) A given test piece was obtained from the sheet-form molded product obtained in the paragraph (2), and the flexibility (hardness), the tensile strength and the elongation at break thereof were measured by the above-mentioned methods. The results are as shown in Table 3.

Example 7

Production and Slush Molding of Thermoplastic Polymer Powder (1) A thermoplastic polymer powder was produced in the same way as in the paragraph (1) of Example 3 except that the triblock copolymer (g) obtained in Referential Example 7 was used.

The average particle diameter and the melt viscosity of the resultant thermoplastic polymer powder were measured by the above-mentioned methods. The results are as shown in Table 3.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 3.

(2) The thermoplastic polymer powder obtained in the paragraph (1) was used to perform slush molding in the same way as in the paragraph (2) of Example 1, thereby producing a sheet-form molded product of 1 mm in thickness. The slush moldability at this time was evaluated by the above-mentioned method. The result is as shown in Table 3.

(3) A given test piece was obtained from the sheet-form molded product obtained in the paragraph (2), and the flexibility (hardness), the tensile strength and the elongation at break thereof were measured by the above-mentioned methods. The results are as shown in Table 3.

Example 8

Production and Slush Molding of Thermoplastic Polymer Powder (1) Seventy parts by mass of the triblock copolymer (d) obtained in Referential Example 4 were mixed with 30 parts by mass of acetyl tri(n-butyl) citrate (manufactured by Sanken Kakoh K.K.) as a plasticizer, and then the mixture was melted and kneaded in a Laboplast mill at 200° C., so as to prepare a triblock copolymer (d) composition.

(2) The triblock copolymer (d) composition obtained in the paragraph (1) was used to produce a thermoplastic polymer powder in the same way as in the paragraph (1) of Example 1.

The average particle diameter and the melt viscosity of the resultant thermoplastic polymer powder were measured by the above-mentioned methods. The results are as shown in Table 3.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 3.

(3) The thermoplastic polymer powder obtained in the paragraph (2) was used to perform slush molding in the same way as in the paragraph (2) of Example 1, thereby producing a sheet-form molded product of 1 mm in thickness. The slush moldability at this time was evaluated by the above-mentioned method. The result is as shown in Table 3.

(4) A given test piece was obtained from the sheet-form molded product obtained in the paragraph (3), and the flexibility (hardness), the tensile strength and the elongation at break thereof were measured by the above-mentioned methods. The results are as shown in Table 3.

Comparative Example 1

Production and Slush Molding of Thermoplastic Polymer Powder (1) A thermoplastic polymer powder was produced in the same way as in the paragraph (1) of Example 1 except that the triblock copolymer (d) obtained in Referential Example 4 was used.

The average particle diameter of the resultant thermoplastic polymer powder was measured by the above-mentioned method. The result is as shown in Table 3. The melt viscosity of the resultant thermoplastic polymer powder was also measured by the above-mentioned method. As a result, the viscosity exceeded the measurement upper limit of a Brookfield viscometer. It was impossible to measure the viscosity.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 3.

(2) The thermoplastic polymer powder obtained in the paragraph (1) was used to perform slush molding in the same way as in the paragraph (2) of Example L. As a result, a molded product having a remarkably uneven surface wherein a large number of pinholes were generated was yielded. Thus, a normal sheet-form molded product was not obtained. Consequently, it was impossible to measure the flexibility (hardness), the tensile strength and the elongation at break.

Comparative Example 2

Production and Slush Molding of Thermoplastic Polymer Powder (1) A thermoplastic polymer powder was produced in the same way as in the paragraph (1) of Example 1 except that a styrene-based copolymer ("SEPTON 2002", manufactured by KURARAY CO., LTD.) was used instead of the triblock copolymer (a) obtained in Referential Example 1.

The average particle diameter of the resultant thermoplastic polymer powder was measured by the above-mentioned method. The result is as shown in Table 3. The melt viscosity of the resultant thermoplastic polymer powder was also measured by the above-mentioned method. As a result, the viscosity exceeded the measurement upper limit of a Brookfield viscometer. It was impossible to measure the viscosity.

The complex dynamic viscosity η*(5) and the complex dynamic viscosity η*(50) of the resultant thermoplastic polymer powder were calculated by the above-mentioned method, and further the Newtonian viscosity index n thereof was obtained from these values on the basis of the above-mentioned equation (1). The results are as shown in Table 3.

(2) The thermoplastic polymer powder obtained in the paragraph (1) was used to perform slush molding in the same way as in the paragraph (2) of Example 1. As a result, a molded product having a remarkably uneven surface wherein a large number of pinholes were generated was yielded. Thus, a normal sheet-form molded product was not obtained. Consequently, it was impossible to measure the flexibility (hardness), the tensile strength and the elongation at break.

Table 2 & Table 3

As can be seen from Tables 2 and 3, the thermoplastic polymer powders of Examples 1 to 8 satisfy the above-mentioned requirements (i) to (iii) and further have a small average particle diameter of 1 mm or less so as to satisfy the requirement (iv), thereby making it possible to yield molded products which are excellent in slush moldability, are good in surface state and have no pinholes smoothly by slush molding. Moreover, the molded products by slush molding are excellent in mechanical properties.

Furthermore, it can be understood from the results in Tables 2 and 3 that as long as the thermoplastic polymer powders of the invention are each a thermoplastic polymer powder which is made mainly of an acrylic block copolymer (I) satisfying the requirement (i) and which is further a thermoplastic polymer powder satisfying the requirements prescribed in the (ii) to (iv), the thermoplastic polymer powders are excellent in slush moldability even if the thermoplastic polymer powders are each made of the acrylic block copolymer (I) alone (Examples 1 to 3, and Examples 5 to 7) or are each made of a composition comprising the acrylic block copolymer (I) together with different components (Examples 4 and 8).

The powder of Comparative Example 1, which is made of the acrylic block copolymer (I) obtained in Referential Example 4 [triblock copolymer (d)] alone, has a Newtonian viscosity index of more than 0.50, the index being represented by the above-mentioned equation (1), so as not to satisfy the above-mentioned requirement (iii). Thus, the powder is poor in melt fluidity so as to exhibit a poor slush moldability. Accordingly, in the molded product obtained by slush molding, the surface thereof is remarkably uneven and further a large number of pinholes are generated.

On the other hand, the thermoplastic polymer powder of Example 8 is a powder produced by use of a composition wherein acetyl tri(n-butyl) citrate (fluidity improver or plasticizer) is added to the triblock copolymer (d), which does not satisfy the requirement (iii), and satisfies not only the requirements (i) and (iv) but also the requirements (ii) and (iii), thereby exhibiting a high fluidity and an excellent slush moldability in the same manner as the thermoplastic polymer powders of Examples 1 to 7.

The powder of Comparative Example 2 has a Newtonian viscosity index of more than 0.50, the index being represented by the above-mentioned equation (1), in the same manner as Comparative Example 1, so as not to satisfy the above-mentioned requirement (iii). Thus, the powder is poor in melt fluidity so as to exhibit a poor slush moldability. Accordingly, in the molded product obtained by slush molding, the surface thereof is remarkably uneven and further a large number of pinholes are generated.

INDUSTRIAL APPLICABILITY

The thermoplastic polymer powder of the present invention is excellent in moldability (in particular, melt fluidity) and can be used effectively in molding techniques using powder resin, such as slush molding, rotational molding, compression molding, extrusion molding, and calendaring, and further can be satisfactorily used in various powder coating techniques. In particular, in the case that the powder is used in slush molding, it is possible to produce smoothly a molded product having unevenness (an uneven pattern) in a skin grain form or in a stitch form or having a complicated shape.

The molded product, the skin material, the painted film, and the like that are obtained by use of the thermoplastic polymer powder of the invention are excellent in weatherability, flexibility, low-temperature properties, rubber elasticity, texture, external appearance, adhesion to polar resins, and others.

The thermoplastic polymer powder of the invention does not contain any plasticizer that is suspected to be environmental disrupter or have carcinogenicity, and the polymer components and so on that constitute the thermoplastic polymer powder do not contain any halogen; therefore, the powder does not cause anxiety of the generation of dioxin by the incineration thereof or carcinogenicity, so as to exhibit an excellent safety.

The thermoplastic polymer powder of the invention makes good use of the above-mentioned excellent properties, thereby making it possible that the powder is effectively used for wide purposes, such as automobile interior members such as an instrument panel, a door trim, a console box, an arm rest, a head rest, a seat, a pillar, a steering wheel, and a ceiling; skin materials for a sofa and various chairs; sporting goods; leisure goods; stationery; lining for houses; mannequins; toy members; outdoor parts such as a street light glove, eaves and a top cover; tanks such as a living fish tank, and an industrial tank; and a lightening cover.

TABLE 1

| Referential Example | Symbol | Structure | Triblock copolymer PMMA block Mw | Triblock copolymer PMMA block Mw/Mn | Whole of triblock copolymer Mw | Whole of triblock copolymer Mw/Mn | Percentage (% by mass) PMMA/PnBA/PMMA |
|---|---|---|---|---|---|---|---|
| 1 | (a) | PMMA-PnBA-PMMA[1] | 10,400 | 1.07 | 77,000 | 1.10 | 15/70/15 |
| 2 | (b) | PMMA-PnBA-PMMA[1] | 10,600 | 1.07 | 60,800 | 1.04 | 20/60/20 |
| 3 | (c) | PMMA-PnBA-PMMA[1] | 7,100 | 1.13 | 82,000 | 1.13 | 12.5/75/12.5 |
| 4 | (d) | PMMA-PnBA-PMMA[1] | 11,300 | 1.07 | 116,000 | 1.06 | 12.5/75/12.5 |
| 5 | (e) | PMMA-PnBA-PMMA[1] | 8,300 | 1.08 | 54,000 | 1.07 | 17.5/65/17.5 |
| 6 | (f) | PMMA-PnBA-PMMA[1] | 10,900 | 1.12 | 37,000 | 1.08 | 30/40/30 |
| 7 | (g) | PMMA-PnBA-PMMA[1] | 7,600 | 1.14 | 49,000 | 1.10 | 15/70/15 |

[1] [Polymethyl methacrylate]-[poly(n-butyl acrylate)]-[polymethyl methacrylate] triblock copolymer

TABLE 2

|  | Example 1 | Example 2 | Example 3 | Example 4 | Example 5 |
|---|---|---|---|---|---|
| [Thermoplastic polymer particles] Formulation (parts by mass) | | | | | |
| Triblock copolymer | (a) 100 | (a) 100 | (b) 100 | (c) 90 | (e) 100 |
| Methacrylic resin | | | | 10 | |
| Styrene-based block copolymer | | | | | |
| Acetyl tri(n-butyl) citrate | | | | | |
| Complex dynamic viscosity | | | | | |
| $\eta^*(5)$ (Pa·s) | 40.6 | 40.6 | 152 | 33.4 | <20 |
| $\eta^*(50)$ (Pa·s) | 40.5 | 40.5 | 148 | 29.4 | <20 |
| Newtonian viscosity index n | 0.001 | 0.001 | 0.01 | 0.05 | <0.1 |
| Average particle diameter (μm) | 430 | 550 | 450 | 390 | 250 |
| Melt viscosity (Pa·s) | 40 | 40 | 140 | 30 | 6 |
| Slush moldability | ⊚ | ⊚ | ⊚ | ○ | ⊚ |
| [Slush molded product physical properties] | | | | | |
| Tensile strength (MPa) | 11.0 | 11.3 | 16.4 | 6.8 | 10.9 |
| Elongation at break (%) | 400 | 420 | 370 | 490 | 300 |
| Hardness (JIS-A) | 65 | 65 | 94 | 35 | 81 |

TABLE 3

|  | Example 6 | Example 7 | Example 8 | Comparative Example 1 | Comparative Example 2 |
|---|---|---|---|---|---|
| [Thermoplastic polymer particles] Formulation (parts by mass) | | | | | |
| Triblock copolymer | (f) 100 | (g) 100 | (d) 70 | (d) 100 | |
| Methacrylic resin | | | | | |
| Styrene-based block copolymer | | | | | 100 |

TABLE 3-continued

|  | Example 6 | Example 7 | Example 8 | Comparative Example 1 | Comparative Example 2 |
|---|---|---|---|---|---|
| Acetyl tri(n-butyl) citrate |  |  | 30 |  |  |
| Complex dynamic viscosity |  |  |  |  |  |
| η*(5) (Pa·s) | <20 | <20 | <20 | 2128 | 3079 |
| η*(50) (Pa·s) | <20 | <20 | <20 | 381 | 508 |
| Newtonian viscosity index n | <0.1 | <0.1 | <0.1 | 0.75 | 0.78 |
| Average particle diameter (μm) | 200 | 420 | 400 | 410 | 450 |
| Melt viscosity (Pa·s) | 9 | 4 | 12 | —[1] | —[1] |
| Slush moldability | ◉ | ◉ | ○ | X | X |
| [Slush molded product physical properties] |  |  |  |  |  |
| Tensile strength (MPa) | 17 | 8 | 4.2 | —[1] | —[1] |
| Elongation at break (%) | 280 | 530 | 400 | —[1] | —[1] |
| Hardness (JIS-A) | 96 | 70 | 30 | —[1] | —[1] |

[1]Impossible to measure

The invention claimed is:

1. A process for producing a thermoplastic polymer powder, the process comprising
subjecting an acrylic block copolymer (I) to an underwater cutting process to obtain a thermoplastic polymer powder,
wherein the acrylic block copolymer is a triblock copolymer (B)(A)(B) wherein block (A) comprises structural units originating from an acrylic ester; and each block (B) comprises structural units originating from a methacrylic ester,
wherein the thermoplastic polymer powder has a complex dynamic viscosity η*(5) of $5.0 \times 10^3$ Pa·s or less, the viscosity η*(5) being measured under conditions of a temperature of 250° C. and an angular frequency of 5 rad/sec;
wherein the thermoplastic polymer powder has a Newtonian viscosity index n of 0.50 or less, the Newtonian viscosity index n being represented by the following equation (1):

$$n = \log \eta^*(5) - \log \eta^*(50) \quad (1)$$

wherein n represents the Newtonian viscosity index, η*(5) represents the complex dynamic viscosity (unit: Pa·s) measured under conditions of a temperature of 250° C. and an angular frequency of 5 rad/sec, and η*(50) represents the complex dynamic viscosity (unit: Pa·s) measured under conditions of a temperature of 250° C. and an angular frequency of 50 rad/sec; and
wherein the thermoplastic polymer powder has an average particle diameter of 1 mm or less.

2. The process according to claim 1, wherein the thermoplastic polymer powder has a melt viscosity measured with a rotary viscometer at 250° C. and a shear rate of 0.2 sec$^{-1}$ of 3000 Pa·s or less.

3. The process according to claim 1, wherein the weight average molecular weight of the acrylic block copolymer (I) is from 5,000 to 200,000.

4. The process according to claim 1, wherein the weight average molecular weight of the polymer block (A) constituting the acrylic block copolymer (I) is from 1,000 to 150,000, and the weight average molecular weight of each polymer block (B) is from 2,000 to 50,000.

5. The process according to claim 1, wherein the difference between the solubility parameter σ(A) (unit: MPa$^{1/2}$) of the starting monomer(s) constituting the polymer block (A) and the solubility parameter σ(B) (unit: MPa$^{1/2}$) of the starting monomer(s) constituting each polymer block (B) is 2.5 or less.

6. The process according to claim 1, wherein the acrylic ester is methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, or allyl acrylate.

7. The process according to claim 1, wherein the acrylic ester is one or more of ethyl acrylate, n-propyl acrylate, isopropyl acrylate, n-butyl acrylate, 2-ethylhexyl acrylate, pentadecyl acrylate, dodecyl acrylate, and 2-methoxyethyl acrylate.

8. The process according to claim 1, wherein the acrylic ester is one or more of ethyl acrylate, n-propyl acrylate, n-butyl acrylate, and 2-ethylhexyl acrylate.

9. The process according to claim 1, wherein the acrylic ester is one or more of n-butyl and 2-ethylhexyl acrylate.

10. The process according to claim 1, wherein the methacrylic ester is methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, and 2-methoxyethyl methacrylate.

11. The process according to claim 1, wherein the methacrylic ester is one or more of methyl methacrylate, ethyl methacrylate, isopropyl methacrylate, n-butyl methacrylate, tert-butyl methacrylate, cyclohexyl methacrylate, and isobornyl methacrylate.

12. The process according to claim 1, wherein the methacrylic ester is methyl methacrylate.

13. The process according to claim 9, wherein the methacrylic ester is methyl methacrylate.

14. The process according to claim 3, wherein the weight average molecular weight of the acrylic block copolymer (I) is from 10,000 to 100,000.

* * * * *